Nov. 3, 1970 — E. N. WRENSHALL — 3,537,681

VALVE GATE WITH DEFLECTABLE FACES

Filed Jan. 24, 1968

INVENTOR.
EDWARD N. WRENSHALL
By Stanley J Price
his Attorney

United States Patent Office 3,537,681
Patented Nov. 3, 1970

3,537,681
VALVE GATE WITH DEFLECTABLE FACES
Edward N. Wrenshall, Ross Township, Allegheny County, Pa., assignor to Kerotest Manufacturing Corp., Pittsburgh, Pa., a corporation of Pennsylvania
Filed Jan. 24, 1968, Ser. No. 700,124
Int. Cl. F16k 3/14
U.S. Cl. 251—193       4 Claims

ABSTRACT OF THE DISCLOSURE

A metallic valve gate having deflectably mounted rigid base members. The valve gate has a pair of generally flat side walls on opposite sides thereof. Each side wall has an annular peripheral shoulder portion defining a recessed portion in the side wall. A resilient member is adhesively bonded to the side wall within the recessed portion. A rigid annular face member, which is preferably formed from a non-corrosive material, is adhesively bonded to the resilient member within the recessed portion and extends outwardly therefrom a distance greater than the annular peripheral shoulder portion. The face member is, therefore, deflectably mounted to absorb stresses across the valve gate and is adapted to deflect to compensate for stresses induced by displacement or non-alignment of the valve seats.

In another form, an inner annular shoulder smaller than and disposed concentrically with the outer annular shoulder is provided to form an annular recessed portion therebetween. In this form, the resilient member and rigid face member are both annular rings and are disposed within the annular recessed portion defined by the two annular shoulders. The adhesive employed to bond the opposite sides of the resilient member to the valve gate side wall and the rigid face member is stable at elevated temperatures and inert to certain gaseous materials.

BACKGROUND OF THE INVENTION

Field of the invention

This invention relates to metallic valve gate members having deflectably mounted corrosion resistant sealing faces. More specifically, it relates to gate members having side walls provided with recessed portions within which are bonded a resilient member and an outwardly extending rigid annular face member.

Description of the prior art

Conventional gate valves have a valve body defining a horizontal flow passage and a perpendicular passageway communicating with the flow passage adapted to receive a vertically reciprocating valve gate. The valve gate is reciprocated vertically to open and close the flow passage. A valve stem extends into the perpendicular passageway and has its lower end secured to a valve gate. Rotation of an operating square in one direction produces rotation of the valve stem and responsive upward movement of the valve gate. Rotation of the operating square in the other direction produces downward movement of the valve gate. Within the valve body adjacent the flow passage are valve gate guides which cooperate with the moving valve gate to assist in effecting proper seating thereof. When the valve gate is closed, the valve gate is seated in sealing position with respect to valve seats formed in the flow passageway of the valve housing so that the flow passageway is closed by the gate.

In order to function effectively, a valve gate must meet several critical requirements. The valve gate must provide an effective seal when in the closed position. This generally requires careful machining of the valve gate and valve seats to close tolerances. Even when the valve gate and valve seats have been machined to the proper tolerances to provide an effective seal, it has been found that the valve housings are subjected to abnormal bending stresses in the field which causes the displacement or skewing of the valve seats. This displacement, although relatively small, may destroy the effective seal of the valve gate in the closed position. For example, the valve housing is subjected to bending stresses by external causes such as the misalignment of pipe sections connected thereto on opposite sides of the valve housing. The misaligned pipe sections bend or distort the valve housing and induce a displacement or skewing of the valve seats. When the valve seats are distorted or skewed, the valve gate does not provide an effective seal in the closed position and leakage occurs around the valve gate. Although the total movement or distortion may be relatively small in magnitude, such as a few thousandths of an inch, this is sufficient to establish substantial leakage between the valve seats and the gate member. Thus, a valve originally fabricated to the proper tolerances may be rendered ineffective by the externally induced bending stresses to the valve housing.

It is also preferable to have a corrosion resistant valve gate that is not subjected to oxidation when exposed to the materials transported through the valve. In a closed position, the valve gate faces are in contact with the material transported through the pipeline and valve and where the valve gate is fabricated from a corrosive material, it is subjected to corrosion or oxidation and after a period of time, the corrosion results in leakage around the valve gate.

It has been previously suggested to effect a seal between a valve gate and valve seat through resilient members mechanically secured to the valve gate and adapted to cooperate with a valve member to effect a seal. This type of seal has been employed as a substitute for a gate member machined to close tolerances adapted for establishment of a metal to metal seal between the gate and valve seat.

A resiliently sealed gate member is disclosed in U.S. Pat. 2,870,987 wherein each side of a gate member is provided with a resilient O ring. The O ring is secured in a depression by cooperation between a gate member flange and a rigid metallic locking ring which partially encompasses the O ring. The locking ring is secured to the gate by means of a screw fastener. The O ring extends out of the recess and engages a valve seat in effecting a seal. A similar gate is disclosed in U.S. Pat. 2,401,377, wherein resilient sealing members are mechanically retained in recesses in the valve gate by means of rigid inserts which deform the sealing member. In such gates, as substantial compression of the O ring is accomplished in effecting the seal there is no substantial residual capacity to absorb stresses which might be established during valve use. Also, there is no substantial capacity to provide multidirectional movement of the sealing member responsive to displacement of the valve seats. As mechanical retention of the O ring is effected by independent mechanical locking means, these locking means must be provided and secured to the gate member.

U.S. Pat. 3088,705 discloses a wedge-type valve gate for use in a fluid carrying valve. It states that among the problems encountered in such valves are distortion of the valve body under internal pressure by stresses imposed on the valve body by adjoining piping to which it is connected. Also, the problem of small foreign particles entering the area between the gate sealing face and the valve seat is noted. This disclosure provides two forms of seal means each of which provides a relatively narrow recess on opposite sides of the gate member. The recess considered in cross section has a trapezoidal base portion and a rectangular upper portion. The trapezoidal base receives a resilient loading member of rectangular cross section which deforms and fills the trapezoidal area during sealing. A generally L-shaped or generally F-shaped metallic member is inserted into the recess with the shorter leg or legs extending outwardly therefrom. A mechanical locking ring secured to the gate member retains the metallic member by overlying a portion of the recess and metallic member. An O-ring seal is adapted to be inserted between the outwardly directed legs of the F-shaped form of metallic member. This type of gate, however, requires an elaborately shaped metallic member which must be retained by independent mechanical means separately joined to the gate body. It also has the disadvantage of requiring machining of the elaborate recess configuration.

With respect to the problem of corrosion resistance, the gate member could be manufactured from a corrosion resistant material in lieu of the usual cast iron or cast steel. Such a gate would, as a practical matter, generally be prohibitively expensive for most purposes. The use of a non-corrosive insert into a valve gate is disclosed in U.S. Pat. 467,955, in which it is suggested that an irregularly shaped brass insert be disposed partly within an irregularly shaped recess in the gate and extending partly along the surface of the gate. Consideration has also been given to placing a corrosion resistant material within the valve seat, as is shown in U.S. Pat. 2,815,187. These known systems provide no simple way of effecting either sectional or total corrosion resistance for a valve gate member of the type employed in a conventional gate valve.

SUMMARY OF THE INVENTION

This invention solves the above mentioned problems by providing a gate which offers effective resistance to valve stresses effective sealing which is maintained in the presence of valve seat displacement and corrosion resistance. The valve gate of this invention has a pair of substantially flat, generally vertical side walls on opposed sides. Each side wall has an annular peripheral transverse shoulder defining a recess having a generally circular periphery. A resilient member is adhesively secured to the gate side wall within the recess. A rigid face member is adhesively bonded to the resilient member within the recess and extends outwardly beyond the annular peripheral shoulder. The rigid face member is preferably an annular band of uniform thickness and has flat faces on opposite sides. The resilient member may be a continuous disc or an annular band and is preferably of uniform thickness.

In another form of the valve gate of this invention, each sidewall has an annular inner shoulder concentric with and smaller than the annular peripheral outer shoulder. The two shoulders define an annular recess within the side wall. The resilient member and rigid face member are both of annular shape and are adhesively secured within the annular recess.

It is an object of this invention to provide a valve gate having adhesively bonded annular face members which provide a simple structure adapted for improved sealing and corrosion resistance.

It is another object of this invention to provide such a gate having improved sealing properties regardless of stress induced displacement of the valve seats.

It is another object of this invention to provide a gate structure which offers manufacturing economy in providing faces of non-corrosive material bonded to a body portion of inexpensive corrosive material.

These and other objects and advantages of this invention will be more completely described and distinctly pointed out in the following specification the accompanying drawings, and the appended claims.

DESCRIPTION OF THE PREFERRED EMBODIMENTS

Figure 1:
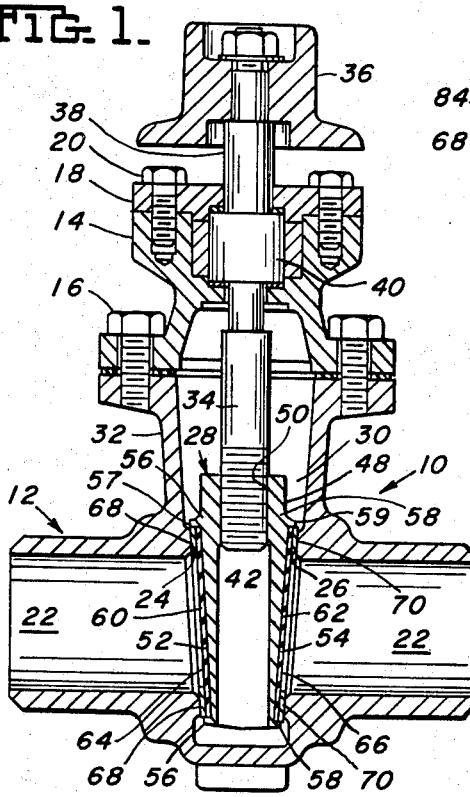
FIG. 1 is a view in side elevation and in section illustrating a valve with one form of my improved valve gate having deflectable valve faces.

Referring to the drawings and particularly to FIG. 1, there is illustrated a gate valve generally designated by the numeral 10 that has a main housing 12 with a bonnet 14 secured thereto by bolts 16. A packing gland 18 is secured to the upper portion of bonnet 14 by bolts 20. The valve main housing 12 has a horizontal passageway 22 through which the fluids flow. Within the passageway there are a pair of annular valve seats 24 and 26. The annular valve seats 24 and 26 are in non-parallel converging relationship to receive a wedge-type gate generally designated by the numeral 28 to seal the passageway 22 and control the flow of fluid therethrough.

A vertical passageway 30 defined in part by the upper neck portion 32 of valve housing 12 and in part by the bonnet 14 communicates with the horizontal passageway 22 in valve housing 12 between the annular valve faces 24 and 26. A valve stem 34 is positioned in the vertical passageway 30 and extends upwardly through bores in the bonnet 14 and packing gland 18. An operating square 36 is secured to the end portion 38 of the stem 34 positioned externally of the valve 10.

The stem 34 has an enlarged portion 40 within the bonnet 14 that prevents vertical axial movement of the stem 34 upon rotation thereof. The stem lower end portion 42 is threadedly secured to the wedge-type gate 28 so that rotation of the stem 34 in one direction will axially move the gate 28 upwardly on the stem 34 to open the passageway 22 within the housing 12. Rotation of the stem 34 in the opposite direction will move the gate 28 downwardly into abutting relation with the valve seats 24 and 26 to close the passageway 22 and stop the flow of fluid therethrough. The valve gate 28 is restrained from rotary motion by suitable valve gate guides formed in the side walls of the valve housing 12 (not shown). The valve gate has mating guides 44 and 46 on opposite ends thereof (FIG. 3) that are positioned in the valve housing guides. Rotation of the valve stem 34, therefore, produces responsive vertical movement in the valve gate 28 depending on the direction of rotation of the valve stem 34.

Referring to the drawings, and particularly to FIG. 1 wherein similar parts will be designated by the same reference numerals, there is illustrated a valve gate, generally designated by the numeral 28, that has a body portion 48 with a vertical threaded bore 50 therethrough in which the threaded end portion 42 of valve stem 34 is threadedly secured. The body portion is disc-like in shape and has a pair of substantially circular opposed side walls 52 and 54. The side walls 52 and 54 are in diverging relationship to each other to form the wedge-shaped gate 28.

In the embodiment illustrated in FIG. 1, both of the opposed walls 52 and 54 are similar in that they both have annular peripheral lips or shoulder portions 56 and 58 with end walls 57 and 59. The annular shoulder portions define inner circular recessed portions 60 and 62.

Disc-like resilient members 64 and 66 are adhesively secured in the respective circular recessed portions 60 and 62 of respective side walls 52 and 54. An annular face member 68 is adhesively secured to the resilient member 60 and has a thickness sufficient to extend outwardly beyond the end wall 57 of annular shoulder 56. The annular face member 68 is preferably an annular metallic disc that has a substantially uniform thickness with a circular outer periphery. A similar annular face member 70 is secured to the resilient member 62 on the opposite side wall of the valve gate 28 and extends outwardly beyond the end wall 59 of shoulder portion 58 and is suitably secured to the resilient member 66.

The annular shoulder portions 56 and 58 on the end walls 52 and 54 form orienting means for the resilient members 60 and 62 and for the annular face members 68 and 70. The lower portions of the annular shoulders 56 and 58 also form a protective lip or shoulder for the resilient members 64 and 66 and the annular face members 68 and 70. As the valve gate reciprocates in the valve housing 12. Frequently, especially when the valve seats are distorted by external stresses, the valve gate in moving into closed position, unevenly engages a lower edge portion of the valve seat. The outwardly extending shoulder portions 56 and 58, which are integrally formed with the valve gate body portion 48, serve as a rigid abutment means to prevent the displacement of the annular face members 68 and 70 and the disc-like resilient members 64 and 66. With the arrangement illustrated in FIG. 1, distortion or skewing of the valve seats due to being subjected to external bending stresses, the valve housing 12 are compensated for by the distortion of the resilient disc-like members 64 and 66 to maintain the annular face members 68 and 70 in abutting and sealing relation with the respective valve seats 24 and 26. The manner in which the resilient members 64 and 66 are distorted will be later explained in greater detail with reference to the embodiment illustrated in FIGS. 2–4.

Figure 4:
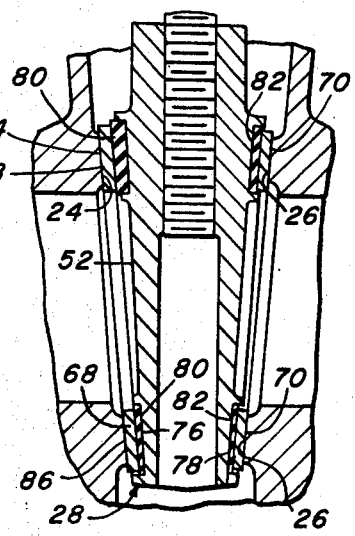
FIG. 4 is a fragmentary view in section of the valve gate illustrated in FIG. 2 positioned in a valve housing wherein the valve seats are displaced due to external stresses with the gate valve faces deflected to compensate for this displacement of the valve seats.
Figure 3:
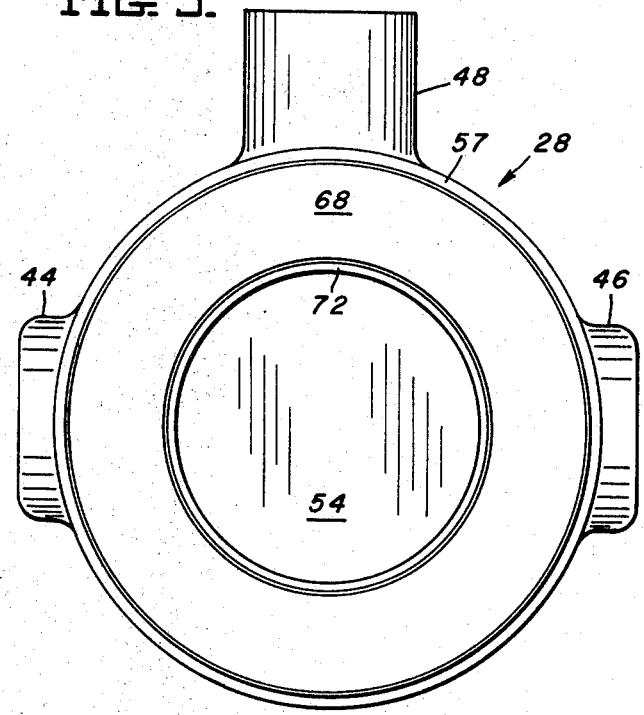
FIG. 3 is a view in front elevation of the valve gate illustrated in FIG. 2.
Figure 2:
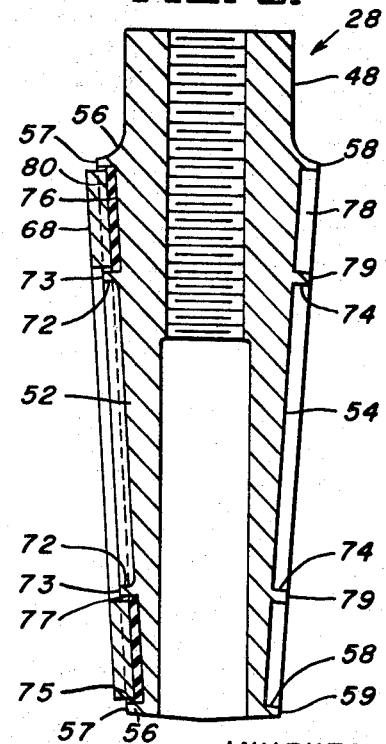
FIG. 2 is an enlarged view in side elevation of another form of my valve gate with concentric annular shoulders extending outwardly from the opposite side walls.

Now referring to FIGS. 2–4, there is illustrated another embodiment of the valve gate 28 wherein the valve gate 28 is similar in structure and further includes other annular shoulders 72 and 74 with annular end walls 73 and 79. The annular shoulders 72 and 74 are concentric with the annular shoulders 56 and 58 to form annular recessed portions 76 and 78 therebetween in the side walls 52 and 54. The recessed portions 76 and 78 are generally rectangular in cross section. Annular bands or discs of resilient material 80 and 82 are adhesively secured in the annular recessed portions 76 and 78 respectively. In FIG. 2, the annular resilient band 82 is omitted to illustrate the annular recessed portion 78. The annular face members 68 and 70 have annular dimensions slightly smaller than the annular dimensions of the recessed portions 76 and 78, as is clearly illustrated in FIG. 2, to form annular spaces designated by numerals 75 and 77. The annular spaces 75 and 77 formed between the annular shoulders, as for example, shoulders 56 and 72 and the annular face 68 provides space for the displacement of the annular resilient band 80 when the annular band 80 is subjected to compression. The annular face members 68 and 70 are adhesively secured to the resilient annular bands 80 and 82.

The valve gate body portion 48 may be fabricated from any conventional material as for example, cast iron or steel. The valve gate of this invention permits the use of inexpensive metals that may be subject to corrosion when exposed to certain fluids. The annular face members 68 and 70 are preferably formed from a material having corrosion resistant properties and are preferably formed from a metal such as brass or bronze. It will be appreciated, however, that the use of brass or bronze for the entire valve gate body portion would be prohibitively expensive. Thus the valve gate 28 of this invention provides the beneficial properties of the noncorrosive metals while permitting the use of corrosive metals for a substantial portion of the valve gate body portion 48.

The annular resilient bands 80 and 82 (FIG. 2) and the circular discs 60 and 62 (FIG. 1) may be formed from a rubber or a composite material having a high rubber content. Any suitable material that has the desired resilient properties to permit deformation of the valve face members to conform to the valve seats is suitable. Where the annular bands 80 and 82 and the circular discs 60 and 62 are formed of a rubber or rubbery material, adhesive bonding of these members to the side walls may be conveniently accomplished by vulcanizing the rubber members to the gate side walls. Where a separate adhesive is employed, it should preferably be inert to organic compounds and be heat resistant up to about 250° F. Epoxy resins and the like have these desired properties and form an effective bond for this purpose.

Referring to FIG. 1, the advantages of the improved valve gate 28 will be apparent. An effective metal to metal seal is obtained between the annular face members 68 and 70 and the valve seats 24 and 26. The resilient members 60 and 62 urge the annular face members 68 and 70 into abutting and sealing relationship with the valve seats 24 and 26. Since the annular face members 68 and 70 are formed from a non-corrosive material, the portions of the valve gate subjected to the corrosive properties of fluids transported through the valve 10 will not corrode and be impaired through corrosion. The circular discs 60 and 62 in the embodiment illustrated in FIG. 1, form a protective overlying layer over the respective valve gate side walls 52 and 54.

The distortion and the deflecting action of the valve gate 28 when the valve seats 24 and 26 are displaced is illustrated in a slightly exaggerated form in FIG. 4. The valve seat 24 in FIG. 4, is shown under stress with the upper portion 84 being displaced a greater amount than the lower portion 86. The annular metallic face member 68 remains in abutting relation with the valve seat upper portion 84 as a result of the expansion of the annular resilient band 80 and remains in sealing relationship with the annular valve seat 24. The expansion of the resilient annular band 80 which is bonded to both the side wall 52 and the annular face member 68 and urges the annular face member 68 against the valve seat 24. The lower portion of the annlar resilient band 80 is compressed and urges the lower portion of the annular face member 68 against the lower portion 86 of the valve seat 24. Thus, the annular face member 68 is urged by the annular resilient band 80 to a position corresponding to the deflection or distortion of valve seat 24 and maintains a continuous metal to metal seal between the two substantially planar surfaces. The other resilient band 82 positioned in the recess 70 compensates for the distortion of the other valve seat 26 and retains the annular face member 70 in abutting and sealing relation with the annular valve seat 26.

It will be appreciated that regardless of whether the valve seats 24 or 26 are in their normal undistorted positions or are displaced away from or toward the valve gate 28, the flat annular face members 68 and 70 will be continuously maintained in sealing engagement with the flat annular surfaces of the respective valve seats 24 and 26. This is accomplished by the resilient annular bands 80 and 82 between the annular face members 68 and 70 and the respective valve gate side walls 52 and 54 within the recessed portions 76 and 78. The resilient members between the above elements permits compressive or expansive movement or displacement of the respective annular face members 68 and 70 to maintain a flat outer surface in sealing relation with the respective valve seats 24 and 26.

In both forms of the invention, the resilient members 60 and 62 and 80 and 82 and the annular face members 68 and 70 are of uniform thickness and have planar surfaces on both sides. The resilient members 60 and 62 substantially completely cover the respective end walls 52 and 54 within the circular recessed portion.

As previously discussed, the conventional type wedge gate members require relatively precise machining to insure proper sealing engagement between the valve gate and the valve seats. The valve gate of this invention eliminates the need for the precise machining as the resiliency of the adhesively bonded resilient members provides adjustability or deflection for the annular face members 68 and 70 to provide adequate sealing without the need for precise, close tolerance machining. As the valve gate moves downwardly, the annular metallic face members 68 and 70 engage the valve seats 24 and 26. A slight compression of the resilient members effectively seats the valve gate in its closed position and urges the face members against the valve seats 24 and 26. Also, unlike conventional valve gates employing mechanical retaining means, the additional machining of separate parts required by the mechanical retaining means is eliminated.

I claim:

1. A valve gate comprising,
    a metallic body member having a pair of substantially planar opposed side walls,
    at least one of said side walls having an annular outwardly extending shoulder portion terminating in an annular end wall, said shoulder portion defining a recessed center portion, said recessed center portion having a planar surface,
    said body member having a vertically disposed passageway between said side walls opening at the top of said body member and adapted to receive a valve stem,
    a resilient member having a circular outer periphery positioned in overlying relation with said side wall and secured thereto within said recessed center portion, said resilient member having a pair of parallel planar surfaces, one of said surfaces secured to said recessed center portion planar surface so that said resilient member other surface is substantially parallel to said recessed center planar surface,
    a rigid metallic face member having an outer circular periphery positioned in overlying relation with said resilient member and secured thereto within said recessed center portion, said rigid face member extending outwardly on said shoulder portion annular end wall and operable to abut an annular valve seat, said rigid face member having an outer planar surface arranged substantially parallel to said recessed center portion planar surface, and
    the outer peripheries of said resilient member and said rigid face member disposed adjacent to said outwardly extending annular shoulder portion.

2. A valve gate member as set forth in claim 1 in which,
    said body member is generally wedge shaped,
    said resilient member is generally circular in shape and substantially completely covers said recessed center portion of said side walls,
    said face member is an annular metal face composed of a noncorrosive metallic material, and
    said side walls diverge upwardly.

3. A valve gate as set forth in claim 1 in which,
    said valve gate is generally wedge shaped,
    said side wall has a second annular outwardly extending shoulder portion concentric with and of smaller diameter than said outwardly extending peripheral shoulder portion,
    said annular shoulder portion defining an annular recessed portion therebetween on said side wall, said recessed portion having a rectangular cross section,
    said resilient member is annular in shape and disposed within said annular recessed portion, said resilient member having a circular outer periphery and a circular inner periphery,
    said rigid face member is an annular metal face member having a continuous flat exterior sealing surface, a circular outer periphery and a circular inner periphery, and
    said annular metal face member is secured in said annular resilient member within said annular recessed portion.

4. A valve gate as set forth in claim 3 in which,
    said resilient member outer circular periphery abuts said outer annular shoulder portion and said inner circular periphery abuts said inner circular portion, and
    said annular metal face member outer circular periphery is spaced from said outer annular shoulder portion and forms an annular space between said annular metal face member and said outer annular shoulder, said annular resilient member, upon compression, operable to deflect into said annular space.

References Cited

UNITED STATES PATENTS

| | | | |
|---|---|---|---|
| 176,321 | 4/1876 | Kromer | 251—327 |
| 1,526,486 | 2/1925 | Mueller | 251—327 X |
| 2,195,923 | 4/1940 | Hehemann | 251—327 |
| 2,457,492 | 12/1948 | Raybould | 251—332 |
| 2,984,449 | 5/1961 | Le Clair | 251—334 X |
| 3,002,525 | 10/1961 | Grove | 251—327 X |
| 3,088,705 | 5/1963 | Blackhall | 251—327 X |

CLARENCE R. GORDON, Primary Examiner

U.S. Cl. X.R.

251—327, 332